No. 772,416.

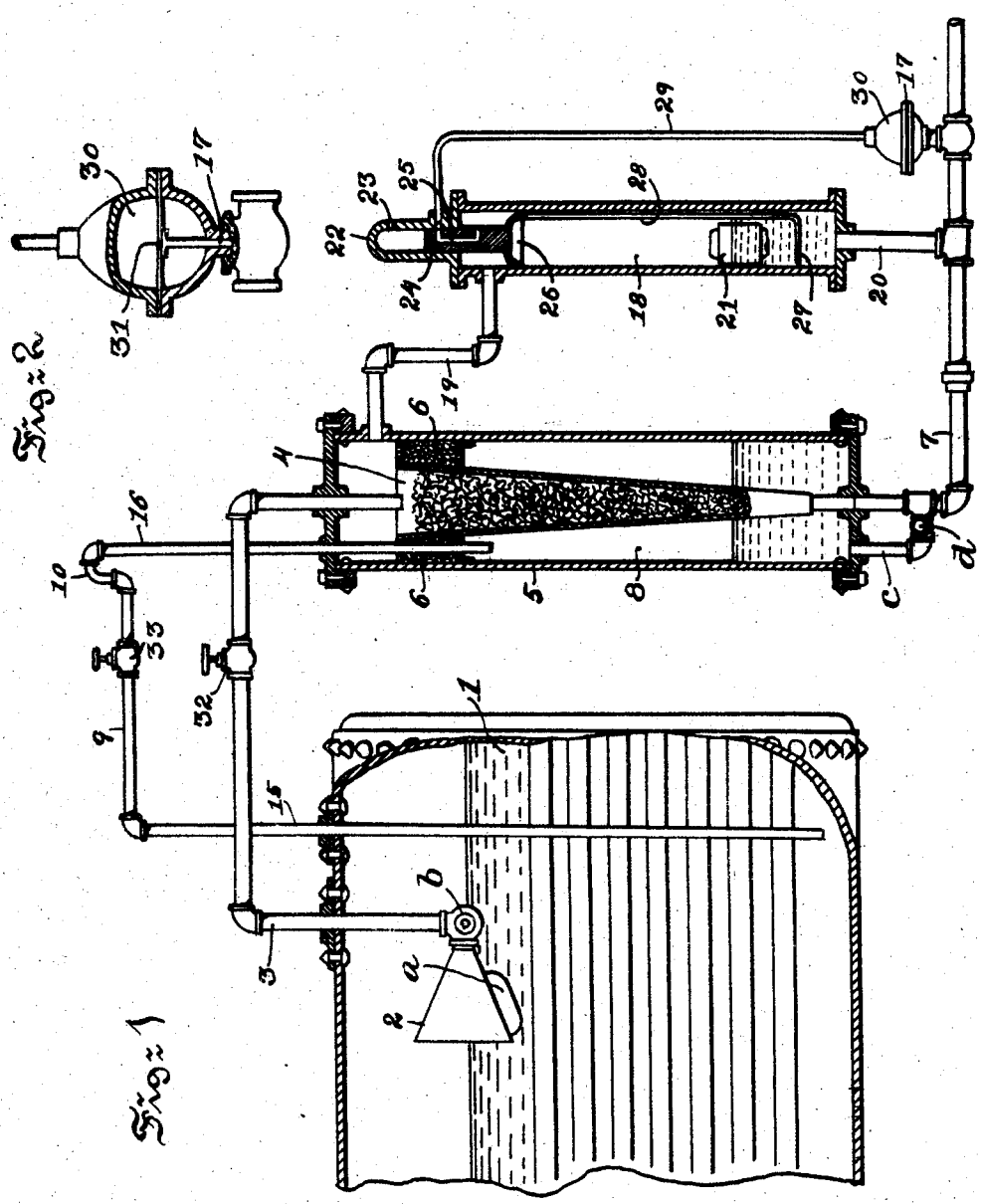

Patented October 18, 1904.

UNITED STATES PATENT OFFICE.

THOMAS DUNCAN JUST, OF PHILADELPHIA, PENNSYLVANIA.

WATER-PURIFIER.

SPECIFICATION forming part of Letters Patent No. 772,416, dated October 18, 1904.

Application filed April 27, 1904. Serial No. 205,142. (No model.)

*To all whom it may concern:*

Be it known that I, THOMAS DUNCAN JUST, a citizen of the United States, and a resident of the city and county of Philadelphia, State of Pennsylvania, have invented certain new and useful Improvements in Water-Purifiers, of which the following is a specification.

My invention relates to improvements in that class of water-purifiers for steam-boilers which operate by skimming from the water in the boiler the impurities which always manifest themselves prior to precipitation upon the boiler plates and tubes as scum upon the surface; and the object of my invention is to furnish, in connection with an acceptable skimming means and a vessel for collecting the scum and the steam and water carried by or carrying the scum through the skimming means, a means for automatically returning from said vessel to the boiler the water and steam carried off with the scum and collected in one compartment of said vessel and for automatically discharging from another compartment of said vessel the scum which is therein collected. In order to successfully and completely eliminate the scum from the water in the boiler, its removal must be practically continuous, and as it is impossible to remove the scum without carrying away with it greater or lesser quantities of steam and water it is very desirable that some means be employed to economically and automatically return these latter, after being separated from the scum, to the boiler with as little loss of temperature as possible.

In carrying out my invention I place at the water-line of the boiler scum-collectors, which are preferably conical in form, the smaller ends being connected with a pipe leading to a tank without the boiler and the larger ends being open to the scum, steam, and water. Within the tank above referred to is a compartment, preferably of conical form, into which the pipe leading from the scum-collectors discharges. The lower end of this compartment is connected with a blow-off pipe which may be periodically opened automatically or manually to clear the compartment of the accumulated scum and mud. Surrounding the scum-collecting compartment is a filter, and beneath the filter is a clear-water compartment, and from this latter compartment a ⊓-shaped pipe leads to the boiler, through which the clear water is returned to the boiler.

In the accompanying drawings, forming part of this specification, and in which similar characters of reference indicate similar parts throughout both views, Figure 1 is a central longitudinal sectional elevation of a steam-boiler and a similar view of my apparatus for separating the scum and water, the connections between the two being shown in side elevation; Fig. 2, a central sectional elevation of the valve in the pipe for drawing scum off from the separator.

1 is a steam-boiler; 2, scum-collectors within the boiler. The scum-collectors 2 are preferably furnished with a float $a$ to cause them to remain at the water-level, and they are attached to the pipe 3 by a rocking joint $b$ to permit their adjustment by the float during changes of water-level. The pipe 3 connects the interiors of the skimmers 2 with a compartment 4, preferably having the form of an inverted cone, within the tank 5.

6 is a compartment within tank 5, which carries a filtering material—charcoal, for instance.

7 is a discharge-pipe connected with the lower end of compartment 4.

8 is a compartment in tank 5 below the filtering-chamber 6.

9 is a pipe connecting the chamber 8 with the water in the lower part of the boiler 1.

10 is a steam-loop in pipe 9.

As the water is boiled in the boiler the impurities which it carries appear upon the surface in the form of scum, and as the pipe 3 is open at its outer end the pressure within the boiler will drive the scum into the scum-collectors 2, together with a certain amount of steam and water, and through the pipe 3 to compartment 4 in tank 5. The steam from pipe 3 and the water rising in compartment 4 will presently overflow the top of this compartment and will pass down through the filtering material in compartment 6 and will be collected as clear water and steam in compartment 8. Connected with the compartment 8 is the leg 16 of the return-pipe 9, the leg 15 of which pipe is connected with the water in the lower part of the boiler, as shown in Fig. 1. The leg 15 of the pipe 9 is open at the lower end to the water in boiler 1, while the lower end of the leg 16 is open to the compartment 8. As the heavily-water-saturated steam in compartment 8 passes up into the leg 16 of pipe 9 it fills this pipe with steam and water, and more or less of the former will be condensed in that part of the pipe which connects the upper ends of the legs 15 16; but as the trend of this pipe is toward the boiler this water will run to the leg 15 and thence to the boiler. The condensation of the steam in the pipe 9 forms a vacuum, and following the line of least resistance the water and steam from compartment 8 rush through pipe 9 to the boiler. A certain amount of steam will rise in the leg 15 of pipe 9, and this will be condensed in the upper part of this pipe or in the pipe which joins this pipe and the leg 16 and will be returned by gravity to the boiler. The return of steam and water through pipe 9 from the compartment 8 to the boiler is more or less intermittent, the steam and water from this compartment being sucked into the leg 15 of pipe 9 when the vacuum is formed, as before described, in the upper part of this pipe. When this vacuum is broken, the passage of the contents of compartment 8 to the leg 15 ceases.

As before stated, the dirt collected in the compartment 4 is from time to time blown off through the pipe 7. The pipe 7 is connected by a pipe $c$ with the clear-water compartment 8 of tank 5, and in the pipe $c$ is preferably a check-valve. When the contents of compartment 4 are blown out through the pipe 7, the check-valve $d$ opens, and any water that may be trapped in compartment 8 passes out of pipe $c$ and into pipe 7 and away. This is done in order to prevent the mouth of the return-pipe 9, which enters compartment 8, from being covered with water, which might in some cases, perhaps, prevent the return of steam and water through pipe 9. When the compartment 4 is filled with scum or before this time, the pipe 7 is opened and the scum blown off therethrough. In order that the scum-collecting chamber may be readily cleaned, I prefer to make it of an inverted conical form, as shown.

The valve 17 in pipe 7 may be hand-operated; but in order to insure its opening and closing at proper intervals I have devised an automatic arrangement for this purpose, as follows: 18 is a chamber the top of which is connected with the upper part of tank 5 by a pipe 19 and the lower part of which is connected with the scum-pipe 7 by a pipe 20. 21 is a float in chamber 18; 22, a cylinder carried by the top of chamber 18; 23, a perforation in this cylinder. 24 is a piston in cylinder 22, which is furnished with a by-pass 25. 26 is a tappet carried by or forming the lower end of piston 24; 27, a tappet carried by an arm 28, carried by piston 24. 29 is a pipe, one end of which enters the lower part of cylinder 22, and the other end of which connects with the valve-chamber 30, which carries the valve 17. 31, Fig. 2, is a diaphragm in valve-chamber 30, which bears against the top of the stem of valve 17. Normally the piston 24 is lowered, and the by-pass connects the upper end of pipe 29 with the interior of chamber 18. Hence the diaphragm is pressed down and the valve 17 closed. As the water rises in tank 5 it also rises in chamber 18, and with it the float 21, which presently will strike tappet 26, lifting piston 24 until the lower end of by-pass 25 connects the upper end of pipe 29 and the perforation 23. The top of the valve-chamber 30 is now connected with the air and discharges steam from top of diaphragm. The valve 17 now rises, and the scum is discharged through pipe 7, and with it the water in chamber 30. The float 21 now falls and, striking tappet 27, lowers the piston 24 until the by-pass 25 again connects pipe 29 and the interior of chamber 18, when the steam-pressure in valve-chamber 30 is reëstablished and the valve 17 closed.

32 is a valve in pipe 3; 33, a valve in pipe 9. By closing the valve 32 water will be forced from the boiler through pipe 9 to the bottom of the filter and up through the same in order to cleanse the latter.

Having thus described my invention, I claim as new and desire to secure by Letters Patent—

1. In a water-purifying apparatus, in combination with a steam-boiler, a means for skimming the surface of the water, and a means without said boiler for separating the scum and steam and clear water, of a ⊓-shaped return-pipe for returning the said steam and clear water to the lower part of the water in said boiler.

2. The combination with a steam-boiler, of an outside tank having scum-collecting and clear-water compartments, a filter separating said compartments, a skimming means for collecting scum in said boiler, means for carrying scum from said skimmer to said scum-compartment in said tank, a ⊓-shaped return-pipe connecting the clear-water compartment in said tank, and the water in said boiler, and means for withdrawing the scum from the scum-compartment in said tank.

3. In a water-purifying apparatus for steam-boilers, in combination, a boiler, a tank without said boiler, said tank being furnished with a scum-collecting compartment and with a clear-water compartment, connected with one another by a filter, said filter, scum-collectors, within said boiler, a pipe connecting said scum-collectors and the scum-collecting compartment within said tank, a blow-off pipe connected with said scum-collecting compartment, and a return water-pipe having a ▯ form, one leg of which connects with the clear-water compartment in the outside tank, the other leg of which connects with the water near the bottom of the boiler, and the top of which has a trend toward the boiler.

4. The combination with the scum-collector, the scum-pipe and the return water-pipe of a boiler-cleaning apparatus, of a tank, a scum-holding vessel having the form of an inverted cone carried by said tank, a filter carried between the sides of said tank and said cone, a clear-water space below said filter, and a blow-off pipe connected with the lower end of said cone, the whole arranged and operating substantially as set forth.

5. In a boiler-cleaning apparatus, in combination, a boiler, a tank, a scum-compartment in said tank, means for conducting scum from said boiler to said tank, a connection between said tank and the lower water-space of said boiler, a pipe leading from the lower end of said scum-compartment, a chamber connected at the upper end with the upper end of said tank, and at the lower end with said scum-pipe, a cylinder at the top of said chamber furnished with an upper and lower perforation in its side, a piston in said cylinder furnished with a by-pass, an upper and a lower tappet in said chamber connected with said piston, a float between said tappets, a valve, in said scum-pipe, a valve-chamber inclosing said valve, a diaphragm in said valve-chamber above said valves, and a connection leading from the lower perforation in said cylinder to the chamber above said diaphragm.

THOMAS DUNCAN JUST.

Witnesses:
GEORGE W. SELTZER,
CHARLES A. RUTTER.